Patented Jan. 30, 1951

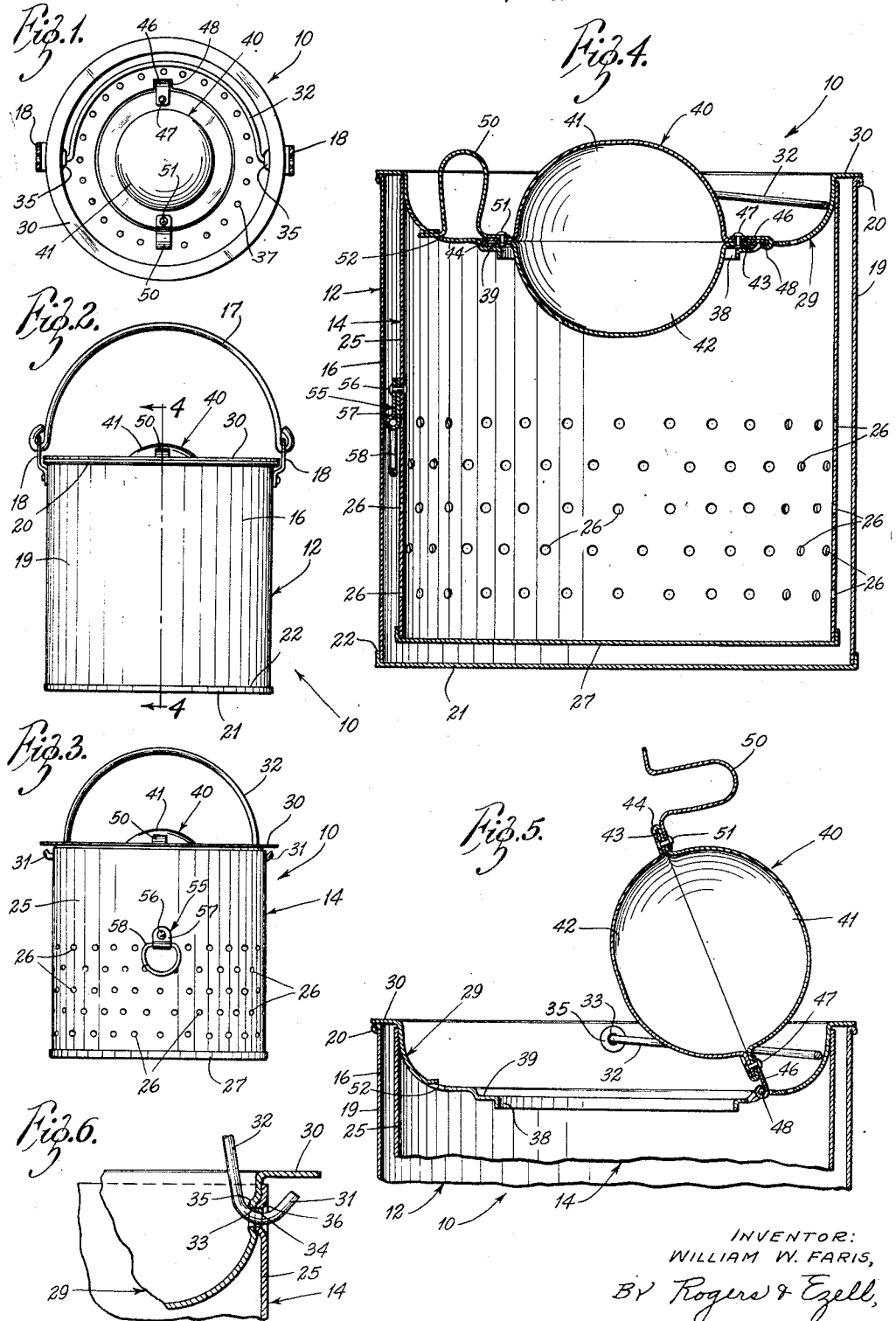
Jan. 30, 1951 — W. W. FARIS — 2,539,412
MINNOW BUCKET
Filed Nov. 28, 1947
INVENTOR:
WILLIAM W. FARIS,
BY Rogers & Ezell,
ATTORNEYS.

2,539,412

UNITED STATES PATENT OFFICE 2,539,412

MINNOW BUCKET

William W. Faris, Webster Groves, Mo.

Application November 28, 1947, Serial No. 788,587

3 Claims. (Cl. 43—56)

The present invention relates generally to fishing equipment, and more particularly to an improved minnow bucket of the floating type.

Minnow buckets have been used by fishermen for many years, but none have been provided which can be trolled behind a boat quietly and smoothly as the boat is moved through the water. Further, no relatively small minnow bucket has been devised in which the float member is arranged and is of the type to give maximum minnow space in the interior of the bucket itself.

Therefore, an object of the present invention is to provide a minnow bucket incorporating a floating minnow container which overcomes the deficiencies found in minnow buckets heretofore employed.

Another object is to provide a novel minnow bucket incorporating a floating minnow container which may be pulled through the water with minimum disturbance and in an upright position as the boat is moved through the water.

Another object is to provide a novel minnow bucket incorporating a floating minnow container which includes a float disposed, at least in part, exteriorly of the minnow space thereof.

Another object is to provide a novel minnow container of aluminum of the floating type, which is formed free of welding or soldering.

Another object is to provide a minnow container of the floating type, which incorporates a combined top closure and float and which includes a visible latch member or catch which effectively maintains the combined closure and float in closed minnow retaining position.

Another object is to provide a novel minnow container which incorporates a novel trolling device whereby the container may be trolled in an upright position and without unduly disturbing the water as it passes through it.

Other objects are to provide a novel minnow container which is sturdy in construction, which has a minnow capacity comparable to presently used minnow containers of stated larger capacity and which is relatively inexpensive.

The foregoing and other objects and advantages are apparent from the following description taken with the accompanying drawing, in which:

Fig. 1 is a plan view of a minnow bucket constructed in accordance with the teachings of the present invention, the outer container bail supports being in section for clarity;

Fig. 2 is a side elevational view thereof, with the outer container bail in raised position;

Fig. 3 is a side elevational view of the inner minnow container;

Fig. 4 is an enlarged cross-sectional view on the line 4—4 of Fig. 2;

Fig. 5 is a fragmentary enlarged cross-sectional view similar to Fig. 4, showing the float in raised position; and Fig. 6 is an enlarged fragmentary cross-sectional view showing a structural feature.

Referring to the drawing more particularly by reference numerals, 10 indicates generally a minnow bucket incorporating the concepts of the present invention. Broadly, the minnow bucket 10 includes an outer container 12 and an inner container 14.

The outer container 12 is preferably of round bucket form and includes a body 16 and a bail 17, the latter being secured to the former by the usual apertured brackets 18. The body 16 includes an annular side wall 19 which is rolled outwardly at the top at 20 to eliminate inward projections. A bottom 21 is secured to the side wall 19 at 22 by a leakproof seam.

The inner minnow container 14 includes an annular side wall 25 having rows of spaced perforations 26 throughout substantially the lower half thereof. A bottom 27 is secured to the lower edge of the annular wall 25 by any desired means. A cup-shaped top member 29 is mounted at the upper edge of the annular wall 25, and includes an annular flange 30 which overlies the upper edge of the wall 25 and rests on the annular wall 19. The lower hook ends 31 of a bail 32 extend through aligned apertures 33 and 34 in interfitting bosses 35 and 36 in the top member 29 and the annular wall 25, respectively, to connect the top member 29 and wall 25 together. The interfitting bosses 35 and 36 removably connect the top member 29 to the inner minnow container 14 due to the snug fit of the former with the annular wall 25 of the latter, as is manifest from an inspection of Figs. 5 and 6, and the hook ends 31 of the bail 32 secure the bosses 35 and 36 against separation.

The top member 29 includes a ring of spaced perforations 37, a central opening 38 and an adjacent annular shoulder 39. A ball float 40, including opposed halves 41 and 42, the latter of which has an annular flange 43 around the free edge of which is crimped in air-tight relation an annular flange 44 of the former, as is clear from Figs. 4 and 5, closes the opening 38. The crimped together annular flanges 43 and 44 rest upon the shoulder 39 (Fig. 4), the ball float 40 being pivotally connected to the top member 29 by a hinge member 46 secured to the annular flanges 43 and 44 by a rivet 47 and to the top member 29 by an anchored pin 48. Diametrically opposed to the hinge member 46 is a visible spring catch or latch 50 secured at one end to the flanges 43 and 44 by a rivet 51. The free end of the spring catch 50 engages a slot 52 formed in the top member 29 to hold the ball float 40 in the closed position of Fig. 4. The spring catch 50 may be easily sprung by hand to engage and to disengage the slot 52, but provides a secure lock.

A trolling device 55 is secured to the outer surface of the annular wall 25 of the inner container 14 by a rivet 56 (Figs. 3 and 4) and includes a bracket 57 and a ring 58. The ring 58 is freely rotatable in the bracket 57 and normally, under the influence of gravity, hangs downwardly as shown in the drawing. However, should the ring 58 become slightly frozen in an outwardly disposed position in respect to the wall 25, it will be readily moved into a vertical position by the wall 19 of the outer container 12 as the inner container 14 is dropped inwardly into suspended position.

The present minnow container is preferably made of light metal, such as aluminum, although other materials may be employed. It is to be noted that no welding or soldering is required on the inner container 14 to effect the floating property.

In use, minnows are disposed in the inner container 14 through the opening 38 after the ball float 40 has been raised to the position of Fig. 5. Thereafterwards, the ball float 40 is locked in the position of Fig. 4 and the inner container 14 lowered into the outer container 12 into which has been previously placed a suitable quantity of water. If desired, ice, or the like, may be placed in the annular sump, formed by the shoulder 39, around the ball float 40.

When it is desired to employ the inner container 14 in its floating capacity in order to preserve minnows within it, it is raised from the outer container 12 and placed in the water in vertical position after a line is connected to the ring 58 of the trolling device 55. Thereafterwards, the minnow container 14 may be pulled in trolling manner behind a boat. The minnow container 14 will maintain an upright floating position and will move through the water without turbulence. Heretofore, floating minnow buckets have been trolled by attaching a line to a bail with the inevitable tipping of the container into an angular position, which manifestly creates quite a disturbance and some drag when pulled through the water.

The capacity of the float 40 must, of course, be coordinated with the weight of the inner container 14, but it has been found that a relatively small float will easily support a minnow container having the capacity of the standard ten quart container when formed of sturdy aluminum. Since half of the float 40 is above the minnow chamber of the minnow container 14, the minnow capacity is increased by that amount. The catch 50 will not come loose during the floating use of the container 14 and is visible for ready check while the same is being handled. In fact, when the float 40 is not in closed position, the catch 50 will strike the concave top member 29 and keep the float 40 in partly raised position, which will warn a user that the catch 50 is not in locked position.

It is apparent that there has been provided a minnow bucket which fulfills the objects and advantages sought therefor.

It is to be understood that the foregoing description and the accompanying drawing have been given by way of illustration and example. It is also to be understood that changes in form of the elements, rearrangements of parts, and substitution of equivalent elements, which will be obvious to those skilled in the art, are contemplated as within the scope of the present invention which is limited only by the claims which follow.

What is claimed is:

1. A minnow container comprising a body having a side wall and bottom, openings in the lower portion of the side wall, a top member on said body, nesting bosses formed in said side wall and top member connecting the same together, and a float member formed as part of said top member.

2. A minnow container comprising a body having a side wall and bottom, openings in the lower portion of the side wall, a top member on said body, nesting bosses formed in said side wall and top member connecting the same together, a bail having its ends extending through two pairs of opposed bosses and anchoring said side wall and top member, and a float member formed as part of said top member.

3. A minnow container comprising a body having a side wall and bottom, openings in the lower portion of the side wall, a top member on said body, nesting bosses formed on said side wall and top member connecting the same together, a bail having its ends extending through two pairs of opposed bosses and anchoring said side wall and top member, and a float member, said float member being pivotally mounted in the top member and forming a closure.

WILLIAM W. FARIS.

REFERENCES CITED

The following references are of record in the file of this patent:

UNITED STATES PATENTS

| Number | Name | Date |
| --- | --- | --- |
| 1,834,329 | Bolte | Dec. 1, 1931 |
| 1,934,815 | Parrott | Nov. 14, 1933 |
| 2,182,160 | Nelson | Dec. 5, 1939 |